United States Patent [19]

Straub

[11] 4,119,333

[45] Oct. 10, 1978

[54] PIPE COUPLING

[76] Inventor: Immanuel Straub, 7323 Wangs, Switzerland

[21] Appl. No.: 816,792

[22] Filed: Jul. 18, 1977

[30] Foreign Application Priority Data

Jul. 21, 1976 [AT] Austria ............................... 25375/76

[51] Int. Cl.² .............................................. F16L 17/04
[52] U.S. Cl. ..................................... 285/112; 285/105; 285/373
[58] Field of Search ................ 285/111, 112, 373, 104, 285/105, 233, 234, 235; 277/74, 79, 70, 71, 149, 153, 157–164

[56] References Cited

U.S. PATENT DOCUMENTS

| 2,395,745 | 2/1946 | King | 285/233 X |
| 3,116,078 | 12/1963 | Scherer | 285/373 X |
| 3,877,733 | 4/1975 | Straub | 285/112 |

FOREIGN PATENT DOCUMENTS

| 522,162 | 3/1921 | France | 285/112 |
| 1,221,348 | 1/1960 | France | 285/112 |

Primary Examiner—Dave W. Arola
Attorney, Agent, or Firm—Werner W. Kleeman

[57] ABSTRACT

A pipe coupling comprising a housing which can be clamped about the pipe ends which are to be interconnected, there being enclosed within such housing an inwardly open gasket of substantially C-shaped cross-section having confronting legs constructed as sealing lips and the web of which bears against the inner surface or inside of the housing. The web is supported upon the sealing lips by a respective spiral or helical spring ring.

8 Claims, 5 Drawing Figures

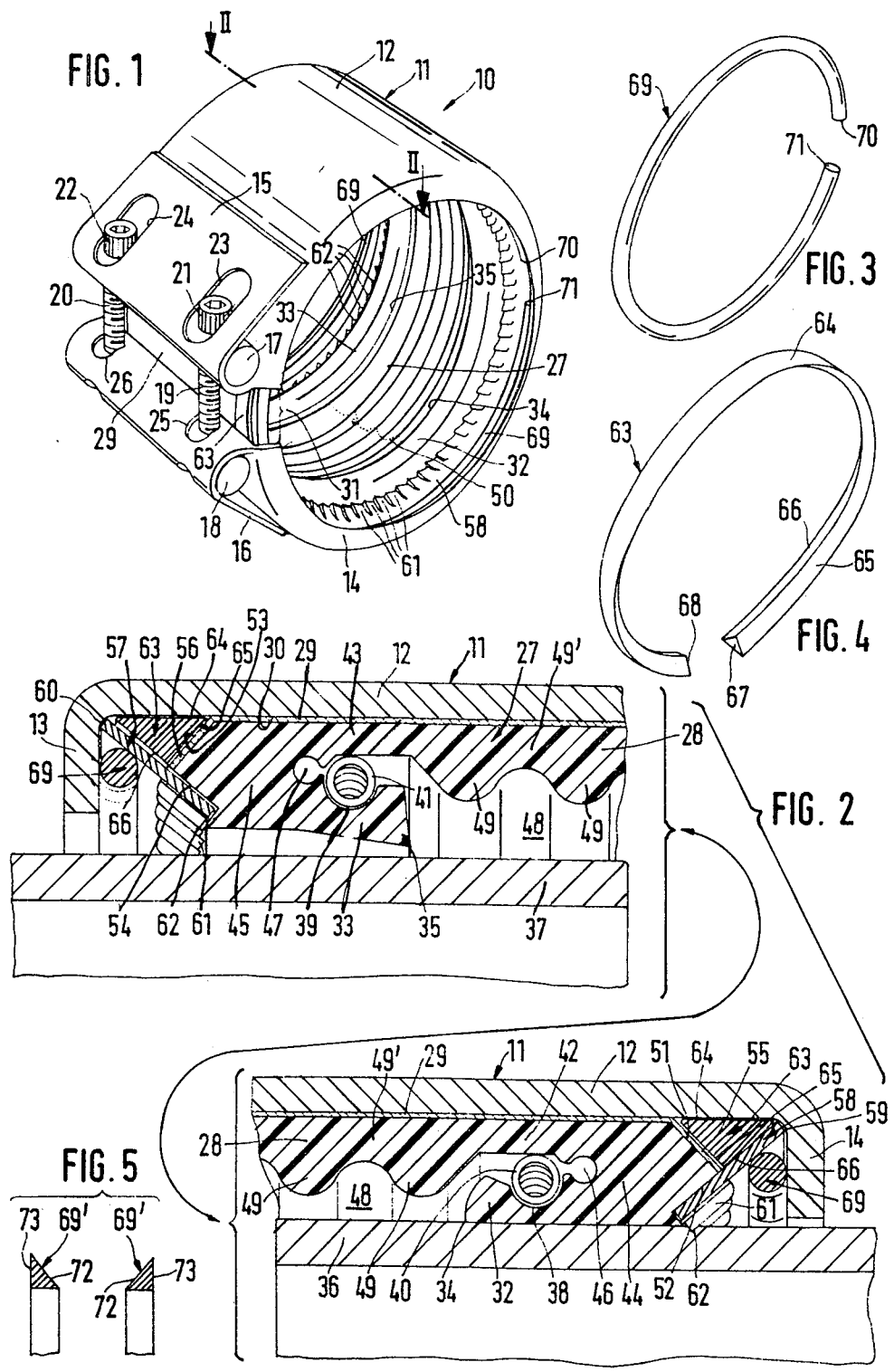

4,119,333

PIPE COUPLING

BACKGROUND OF THE INVENTION

The present invention relates to a new and improved construction of a pipe coupling of the type comprising a housing which can be clamped about the pipe ends which are to be interconnected, a gasket having a substantially C-shaped axial cross-section and which opens towards the inside is enclosed in the housing, and the confronting legs of such gasket are structured as sealing lips and the web of which is supported against the inside of the housing.

SUMMARY OF THE INVENTION

It is a primary object of the present invention to construct a pipe coupling of the type basically described in German patent publication No. 24 28 101 in such a manner that the sealing action is ensured right from the start and is practically unlimited with time, independent of the dimensional accuracy of the pipe ends which are to be interconnected and the properties of their surface, as well as independent of the pressure conditions prevailing in the pipe or conduit and the temperature effects which are brought about by the medium conducted through the pipe or the surroundings.

Still a further significant object of the present invention aims at providing a new and improved construction of pipe coupling wherein the sealing lips uniformly tightly enclose the pipe ends under all conditions over their entire periphery.

Now in order to implement these and still further objects of the invention, which will become more readily apparent as the description proceeds, the invention contemplates supporting the web at the sealing lips by means of a respective conventional spiral or helical spring ring.

According to U.S. Pat. No. 3,420,554, there are provided in the housing of a pipe coupling which surrounds a gasket, which in this case however is open towards the outside and possesses a substantially C-shaped cross-section, inserts in the form of spiral or helical spring rings. Such however bear against the end faces of the gasket, in order to prevent flowing-out of the gasket material along the jacket or outer surface of the pipe ends. However, the spiral or helical spring rings — hereinafter simply referred to as helical spring rings — inserted in this case between the sealing lips and the web carry out quite different functions. Firstly, they transmit the forces which are exerted radially inwardly from the housing to the web, to the sealing lips and therefore the gasket, upon closing of the housing, can be upset in the peripheral sense without the web and/or the sealing lips being deformed in an undulatory or wave-like manner. During this upsetting action the sealing element composed of the gasket and the helical spring rings are uniformly loaded approximately in the manner of a plastic mass and deformed, whereby the sealing lips close about the pipe ends with a so-to-speak "strangle hold" and merge, as stated, similar to the behavior of a plastic mass, against the pipe jacket or shell. Consequently, the coupling is completely sealingly tight right after assembly thereof, and specifically even then when the pipe ends possess welding seams or other appreciable irregularities. This operating condition is not affected by temperature fluctuations, even if thereby there prevails considerable and long lasting pressure periods, since the helical spring rings are readily capable of compensating the swelling or contraction of the gasket material. Important in this regard is also the inherent pre-bias or stress of the helical spring rings. Further functions of the helical spring rings will be explained more fully hereinafter.

According to a preferred exemplary embodiment, the region of the web which is disposed between the helical spring rings, possesses at its inwardly confronting side conventional ring beads, and thus preferably a wavelike or undulatory axial profile. These ring beads prevent a wave-shaped deformation of the web and specifically both during the assembly of the pipe coupling as well as also due to thermal expansions and swelling of the material itself under temperature effects. The web always bears against the inner wall of the housing, namely also then when the inside of the pipe is without pressure after a long high temperature period.

According to a further preferred embodiment of the invention, the web is surrounded or enclosed by a finite steel band insert which possesses radially inwardly flexed edges. A steel band insert of this type which is capable of contracting, provides the actual sliding coating or covering. Additionally, it functions at the region of a slot of the housing as a bridge, which, by virtue of the flexed or bent edges of the band, even in the case of relatively large slot widths, is capable of supporting the gasket and inwardly pushing the same at the region of the housing.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective view of a pipe coupling ready to be mounted upon the pipe ends which are to be interconnected;

FIG. 2 is a cross-sectional view taken substantially along the line II—II of FIG. 1 with the pipe ends introduced into the pipe coupling, and such section is shown in two superimposed halves, wherein the upper half essentially corresponds to the half of the pipe coupling appearing at the left of FIG. 1 at the time that such coupling is still loosely drawn about the corresponding pipe ends, and on the other hand, the lower half portrays the half of such pipe coupling appearing at the right of FIG. 1 when the housing is clamped or tightened;

FIGS. 3 and 4 are perspective views of two of the elements of the pipe coupling illustrated in FIG. 1, showing the same as if such elements of FIG. 1 were removed therefrom without any rotation thereof; and FIG. 5 is a partial sectional view of a variant exemplary embodiment of the element shown in FIG. 2.

DETAILED DESCRIPTION OF THE PREFERRED EMBODIMENTS

Describing now the drawings, the pipe coupling 10 illustrated by way of example in FIGS. 1 and 2 will be seen to comprise a housing 11 approximately in the shape of a tightening clamp or collar, the housing body 12 of which is essentially cylindrical and possesses at its ends inwardly directed flanges 13 and 14. The housing 11 is formed of one-piece of a high strength sheet metal, for instance rust proof steel. Flaps 15 and 16 formed integrally or of one-piece with the housing 11 and flexed outwardly and away from one another enclose a respective, for instance, cylindrical clamping rod 17,18 or equivalent structure. These clamping rods 17 and 18 are interconnected with one another by means of a number of bolts, here shown as two internal hexagonal bolts 19 and 20. The free end edges of the flaps 15 and 16 are advantageously welded with the outer jacket or shell surface of the housing body 12. In the exemplary embodiment under discussion, the heads 21 and 22 of the internal hexagonal bolts 19 and 20, respectively, are accessible by means of elongate holes 23 and 24, respectively, formed in the flap or tab 15. The part of the bolts 19 and 20 merging with the heads 21 and 22, respectively, engages with some play through not particularly illustrated transverse bores in the clamping rod 17, through non-visible openings at the flexed region of the flap 15, then with play through openings 25, 26 at the bent or flexed region of the flap 16 and finally in transverse bores provided with internal threading and disposed at the clamping rod 18. From what has been discussed above it will be apparent that the housing 11 can be contracted or drawn together by tightening the bolts 19, 20 in the manner of a tightening clamp or collar.

As to the components which are present in the housing 11 between the flanges 13 and 14 attention is especially directed to the showing of FIG. 2. The housing 11 encloses or surrounds a sealing gasket 27, preferably formed of a synthetic rubber. This sealing gasket 27 is inwardly open and possesses a substantially C-shaped configuration in its axial cross-section. It has a web 28 which tightly bears at its outer surface or slide, while interposing a steel band insert 29, at the cylindrical inner surface 30 of the housing body 12. The steel band insert 29, among other things, serves to bridge the gap, generally indicated in FIG. 1 by reference character 31, present between the flexed or bent regions of the flaps or tabs 15 and 16. Further details of the steel band insert 29 will be considered hereinafter.

Merging with both ends of the web 28 of the sealing gasket 27 are the ends thereof which are formed as sealing lips 32 and 33. These sealing lips 32 and 33 possess at their free end edge a sharp sealing edge 34 and 35 respectively, which upon clamping or tightening of the housing 11 sealingly come to bear upon the jacket or shell surface of the pipe ends 36, 37 which are to be interconnected by the pipe coupling 10, wherein it will be observed that at the upper portion of the showing of FIG. 2 the housing is not yet fixedly clamped. At each side of the sealing lips 32, 33 confronting the web 28 there is formed an annular or ring-shaped groove 38, 39 which is open towards the outside and possesses an approximately semicircular-shaped cross-sectional configuration. In each such ring-shaped groove 38, 39 there is imbedded a practically closed, slightly expansible metallic helical spring ring 40 and 41 respectively. Such bear at their outer periphery against a comparatively thin-walled region 42 and 43 of the web at its inside and is conversely also supported thereon. Between the ring-shaped grooves 38 and 39 and the actual root 44 and 45 of the sealing lips 32 and 33 there is present a respective ring-shaped hollow space or chamber 46 and 47 which communicates by means of the windings of the helical spring rings 40 and 41 with the space or chamber 48 between the inside of the web 28 and the outside of the pipe ends 36 and 37.

The sense of this arrangement is the following. The helical spring rings 40 and 41 essentially carry out four functions. By virtue of the fact that they are supported at the outside at the inside of the regions 42 and 43 of the web 28, they, first of all, ensure that during clamping of the housing the sealing lips 32 and 33 will be pressed immediately with a larger radial contact force than only by the inherent elasticity against the outside of the pipe ends 36 and 37 respectively. Secondly, since they are slightly expanded, they ensure that the internal pressure of the pipes, which impinges through the pipe joint the space or chamber 48, also is effective over the entire length of the side of the sealing lips 32 and 33 confronting the web 28 inclusive of the hollow spaces or chambers 46 and 47 and thus hydrostatically inwardly presses the sealing lips at their entire outer periphery. Thirdly, the helical spring rings ensure — and this is completely within the teachings and sense of the present invention —, especially upon loss of the inherent elasticity of the material of the sealing gasket 27 due to multiple thermal alternating loads which occur over a long period of time, displacement of the sealing lips 32 and 33 always at the outer periphery of the pipe ends 36 and 37, also then if at any time there is not present any internal pressure and even if the possibly no longer sufficiently elastic material of the gasket would enable lifting-off of the sealing lips 32 and 33. At the same time, the helical spring rings 40 and 41 also prevent a lifting-off of the thin-wall regions 42 and 43 of the gasket web 28 from the steel band insert 29, which lifting-off action can arise by virtue of the practically unavoidable ageing of rubber material in the presence of thermal loads, and as soon as the internal pressure of the pipe drops or no longer prevails.

This last-mentioned phenomenon also is counteracted by the particular profiling of the inside of the region of the web 28 which is disposed between the sealing lips 32 and 33. It will be recognized that this region does not exhibit a constant wall thickness, rather has mutually axially spaced, substantially ring-shaped beads 49 which protrude towards the inside and which impart to the inner surface of such region an undulated or wave-like profile or configuration. This profile has been indicated in FIG. 1 by the broken lines 50. These beads 49 serve as radially outwardly effective reinforcement ribs which prevent a lift-off of the web 28 from the steel band insert 29 when the gasket-material again contracts following a preceding thermally-responsive elongation.

From what has been discussed above, it will be apparent that the web 28 of the sealing gasket 27 — viewed in axial section — is not stiffened or reinforced, as with the prior art pipe coupling, essentially only at the region of the sealing lips 32, 33 in the radial direction by the supporting means (in this case by the helical spring rings 40, 41), rather possesses at the region disposed between the sealing lips 32 and 33 reinforcement elements in the form of ring beads 49 formed thereat and effective radially towards the outside. It has been found that due to this shaping or profiling of the web 28, even when the pipe coupling is used over a long period of time at operating temperatures near the permissible upper boundary for the material from which the gasket is formed, the web of the gasket is displaced in order to snugly bear against the inner wall 30 of the housing 11 and at the steel band insert or insert member 29, even if the material of the gasket, due to the long-time loading, has somewhat lost its original elasticity properties. The sealing action of the pipe coupling is also then still ensured when the original elastic properties of the material of the gasket are replaced by more plastic properties, namely also because the helical spring rings 40 and 41 retain their elasticity far beyond the temperature boundaries permissible for the rubber material.

The end faces of the sealing gasket 27 are subdivided into two essentially conical surfaces 51,52 and 53,54 respectively. The radially outer conical surfaces 51,53 bear at the inwardly flexed or bent side edges 55,56 of the steel band insert 29. Although not particularly illustrated, such itself advantageously possesses, in the non-tightened condition of the housing 11, the shape of a not completely closed winding, and the ends thereof are approximately spaced from one another through a distance corresponding to the spacing of the flexed sections of the flaps 15 and 16, whereby however it is to be understood that such ends of the steel band insert 29 are preferably arranged at a location situated diametrically opposite the gap 31.

The inner conical surfaces 52 and 54 of the ends of the gasket 27 each tightly abut against a substantially truncated-shaped clamping ring 58 and 57, respectively. Each such clamping ring, likewise fabricated of a high strength steel, comprises a band which is conically bent into somewhat more than one winding with mutually loose overlapping winding ends. At their greater diameter the clamping rings 57 and 58 are axially retained in the housing in the respective throat 59 and 60 between the housing body 12 and respective flange 14 and 13. At the region of their smaller diameter the clamping rings possess a large number of lamellae or tabs 61 which are formed by substantially J-shaped cut-outs, these lamellae being turned-out of the conical surface of the related clamping ring, so that they overlap one another in an imbriciated fashion. The free end edges of each of these lamellae or tabs 61 thus form a claw 62 which is intended to dig into the jacket or shell surface of the pipe ends to be interconnected and to be fixedly anchored thereat.

Now if starting with the position portrayed at the top of the showing of FIG. 2 the housing 11 is clamped over the pipe ends 36, 37, then the claws 62 at the ends of the lamallae or tabs 61 of the clamping rings 57 and 58 dig directly into the outer jacket or shell of the pipe ends. This is so because the clamping rings 57, 58 are clamped at the region of their largest diameter, in other words at the throats or fillets 60 and 59 respectively, by means of a socket which engages both at the outer as well as also at the inner jacket surface. This socket, on the one hand, comprises an outer, massive circlip or snap ring 63 (cf. FIG. 4) possessing a cross-section in the form of a triangle with inwardly pointing tip or apex. The snap ring 63 thus possesses a cylindrical outer surface 64 which snugly bears at the inside or inner surface 30 of the housing 12 at the region of the throats or fillets 59, 60, a first substantially conical surface 65 which snugly bears at the side edges 55 and 56, respectively, and thus upon the conical surfaces 51 and 53, respectively, of the ends of the gasket 27, and finally a second substantially conical surface 66 which snugly bears at the outer jacket surface or shell of the clamping rings 57 and 58 respectively. At best seen by referring to FIG. 4, the ends 67, 68 of the snap ring 63 (with non-clamped housing 11) are located at most from one another to such an extent as the flexed parts of the flaps 15 and 16, so that upon tightening the housing 11 they come to snugly bear upon one another and the snap ring 63 becomes a stiff, closed ring. The gap between the ends 67 and 68 is of course arranged to be turned with regard to the gap 31, as will be apparent from the showing of FIG. 4 in conjunction with that of FIG. 1.

On the other hand, the socket or mounting of the clamping rings 57 and 58 provided with the lamallae possesses a further snap ring 69 (FIG. 3) engaging at its inner jacket surface, which snap ring, in the embodiment of FIGS. 1 to 3, possesses a circular-shaped cross-section. Each such snap ring 69 is supported at the inside of the related flange 13 and 14 respectively, as shown. The ends 70 and 71 of the snap ring 69 (with non-tightened housing 11) are located approximately at the same spacing from one another as the ends 67, 68 of the snap rings 63 and can come to tightly or snugly bear against one another when the housing is tightened. The gap between the ends 70 and 71 is arranged so as to be turned in the pipe coupling 10 both with regard to the gap 31 as well as also with respect to the gap between the ends 67 and 68.

The mounting or socket which is defined by the snap rings 63 and 69 of the clamping rings 58 and 57 affords, notwithstanding the flexibility of the material of the gasket 27, the assurance that upon tightening the housing 11 the claws 62 will be directly forced to anchor into the outer surface of the pipe ends 36 and 37 to be interconnected, even if there is not yet present any hydrostatic pressure in the space or chamber 48 which would be effective by means of the incompressible gasket 27 thereof. Right from the start the illustrated pipe coupling provides not only a tight sealing connection of the pipe ends but also a formlocking connection which is the same in the axial direction as well as in the rotational direction, as soon as the housing is fixedly clamped. This connection is maintained also throughout a practically unlimited operating duration, even if the operating temperatures are situated close to the upper permissible boundaries.

A variant embodiment of the snap rings 69 has been shown in FIG. 5. In the showing of FIG. 5 each snap ring has been designated by reference character 69' and will be seen to comprise a triangular cross-section and thus a conical surface 72 which is intended to bear at the inner jacket surface of the clamping rings 57 and 58, respectively, as well as a flat ring-shaped surface 73 which is intended to bear at the inside of the flange 13 and 14 respectively. The radial innermost point of attack of the clamping ring 69 or 69' which engages at the inner jacket surface of the clamping rings 57 and 58 is located at a larger diameter than the radial innermost point of attack of the clamping ring 63 which engages at the outer jacket surface or shell of the clamping rings 57 and 58 respectively. Consequently, the clamping rings 57 and 58 have the possibility of enlarging their aperture angle, with the result that the claws 62 tend to dig even more deeply into the outer surface of the pipe ends 36 and 37 which are to be interconnected.

While there are shown and described present preferred embodiments of the invention, it is to be distinctly understood that the invention is not limited thereto, but may be otherwise variously embodied and practiced within the scope of the following claims.

Accordingly, what I claim is:

1. A pipe coupling for coupling together the pipe ends of pipes which are to be interconnected, comprising:
   a clampable housing capable of being clamped about the pipe ends intended to be interconnected;
   a sealing gasket enclosed in said housing and possessing a substantially C-shaped axial cross-sectional configuration;

said sealing gasket being open towards an inside portion thereof and having confronting legs structured as sealing lips and a web bearing against an inner surface of said housing, said sealing lipas extending between a respective lip root and a respective lip free end, the free end of each lip defining a sealing edge, each sealing edge defining an inner diameter greater than the outside diameter of said pipe ends prior to clamping of said clampable housing; and a respective helical spring ring for supporting the web at the sealing lips arranged at a point intermediate said lip roots and said sealing edges.

2. The pipe coupling as defined in claim 1, wherein:
a region of the web located between the helical spring rings possesses ring bead means at an inwardly directed side thereof for radially reinforcing said web.

3. The pipe coupling as defined in claim 2, wherein:
said ring bead means possess a substantially wave-shaped axial profile.

4. The pipe coupling as defined in claim 1, further including:
a finite steel band insert surrounding said web;
said steel band insert possessing radially inwardly bent edges.

5. The pipe coupling as defined in claim 4, further including:
a profile ring segment provided for each inwardly bent edge; and
said radially inwardly bent edges of the steel band insert being supported at their outer side by means of the associated profile ring segment at the inner surface of said housing.

6. The pipe coupling as defined in claim 1, including a hollow annular chamber in said sealing gasket arranged at each lip root of the sealing lips, said annular chambers being in fluid communication with the inside portion of said gasket through a respective helical spring ring.

7. The pipe coupling as defined in claim 2, wherein said ring bead means include a plurality of substantially ring-shaped, axially spaced beads.

8. The pipe coupling as defined in claim 1, wherein said helical spring rings are arranged in semicircular-shaped grooves formed on the circumferential surfaces of said sealing lips which confront said web.

* * * * *

UNITED STATES PATENT AND TRADEMARK OFFICE
CERTIFICATE OF CORRECTION

PATENT NO. : 4,119,333
DATED : October 10, 1978
INVENTOR(S) : IMMANUEL STRAUB

It is certified that error appears in the above-identified patent and that said Letters Patent are hereby corrected as shown below:

In title page, section [30] (Foreign Application Priority Data) read "25375/76" as -- 5375/76--

*Signed and Sealed this*

*Sixth* Day of *February 1979*

[SEAL]

Attest:

RUTH C. MASON
*Attesting Officer*

DONALD W. BANNER
*Commissioner of Patents and Trademarks*